Patented Nov. 10, 1925.

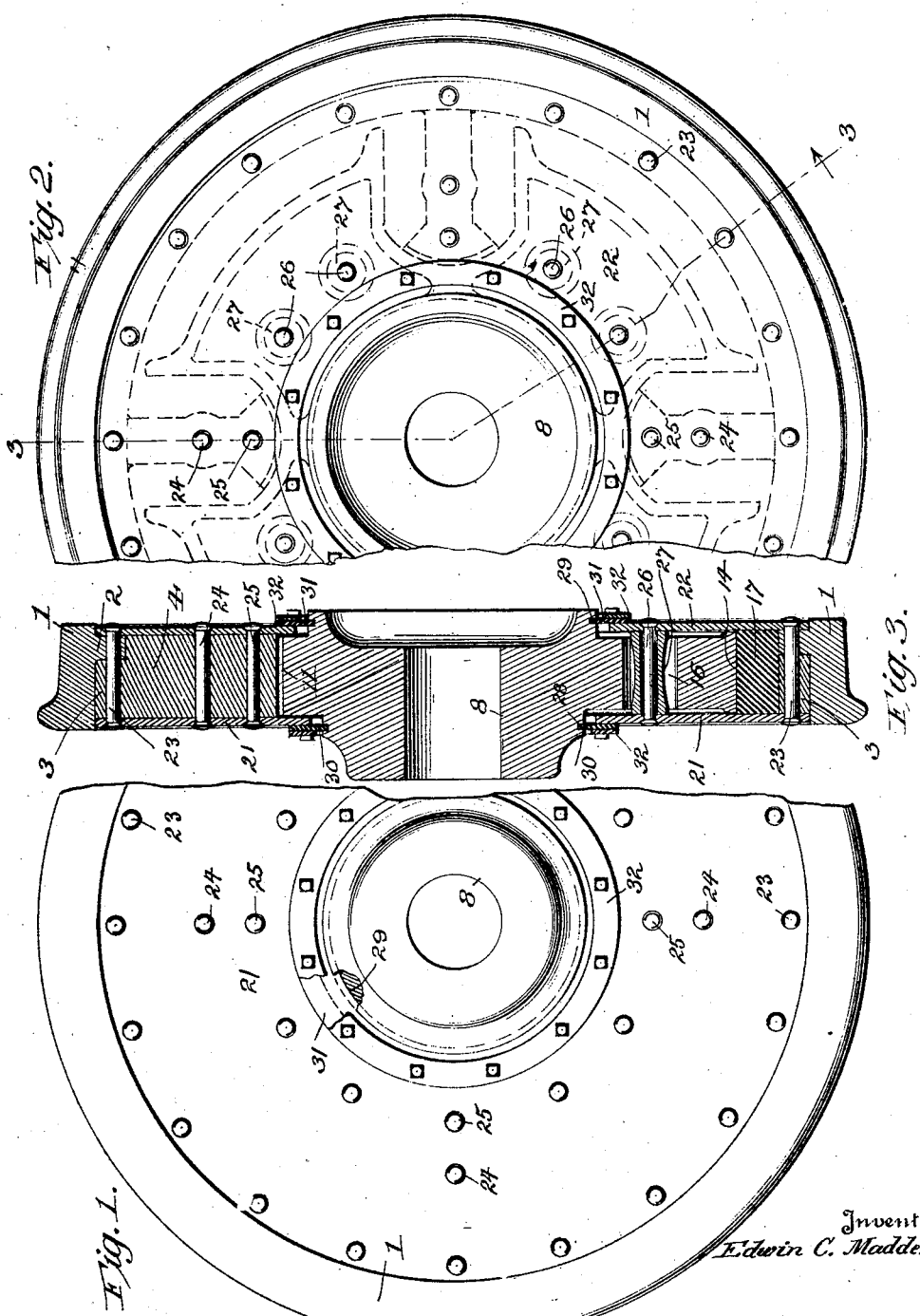

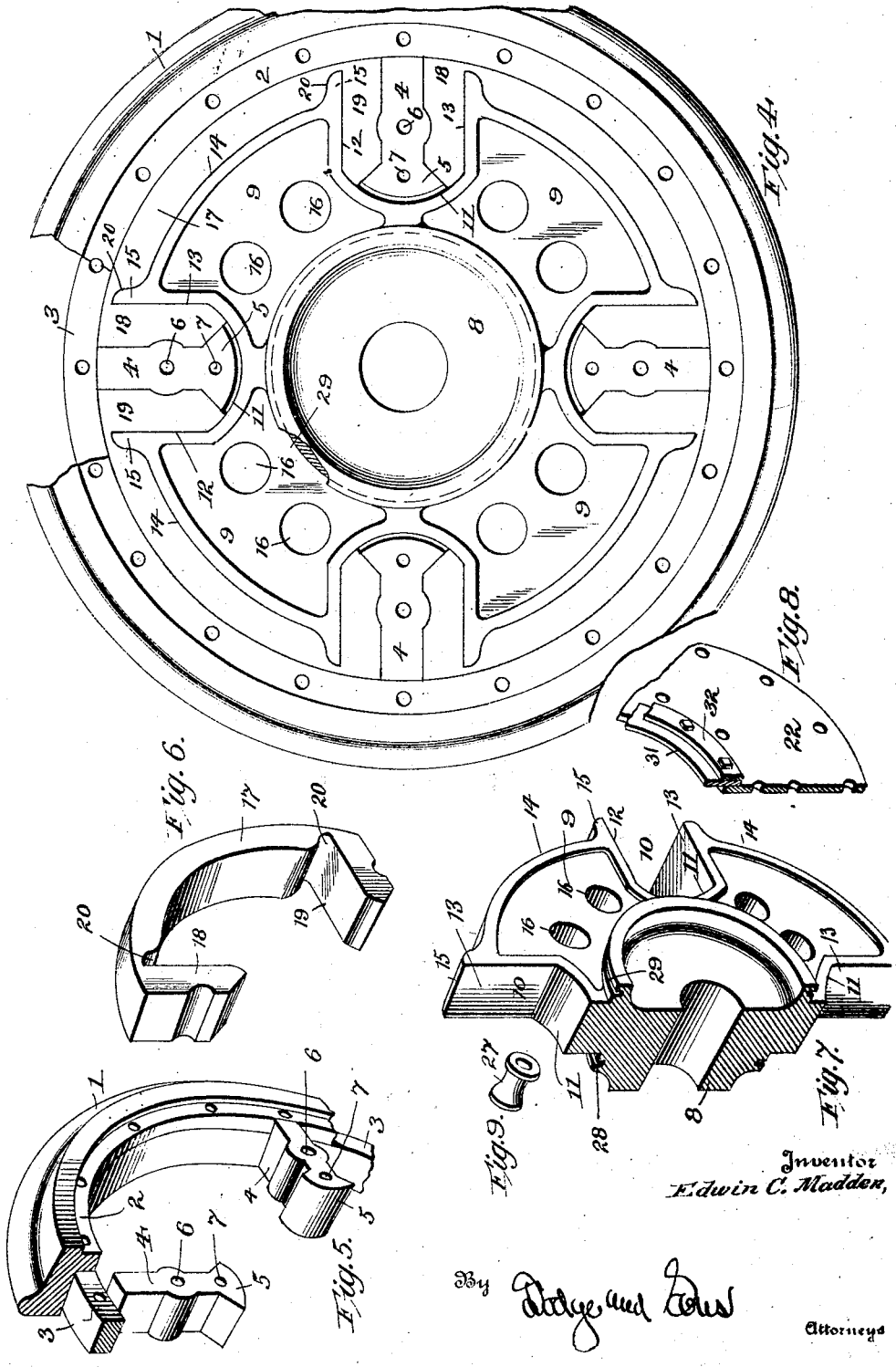

1,560,836

UNITED STATES PATENT OFFICE.

EDWIN C. MADDEN, OF NEW YORK, N. Y.

WHEEL.

Application filed January 4, 1924. Serial No. 684,390.

*To all whom it may concern:*

Be it known that I, EDWIN C. MADDEN, a citizen of the United States, residing at New York, in the county of New York and State of New York, have invented certain new and useful Improvements in Wheels, of which the following is a specification.

This invention pertains to improvements in wheels, and more particularly to that type of wheels wherein cushion (element or) elements are imposed between the rim of the tire or tread member of the wheel and the hub with a view of absorbing shocks, thus insuring longer life to the roadway, the wheel structure as such, and the vehicle which is supported by the wheel.

The present invention is in the nature of an improvement upon the wheel structures set forth in U. S. Letters Patents granted to me Nos. 783,294 dated February 21, 1905, 1,122,620 dated December 29, 1914, and 1,183,475 dated May 16, 1916.

With the prior constructions, as set forth in the above-mentioned patents, the cushioning element interposed between the rim and tread and the central portion of the wheel was continuous, and the radial movement of the parts with relation to each other was more or less restricted. While the wheels, as shown in said patents, and more particularly the wheel set forth and claimed in the latter issued patent, have been found to give fairly good results in practice, yet, by reason of the limitation of the relative radial movement of the parts, sufficient cushioning effect was not had, and as a result the cushioning element would break down. The principal cause of failure of the cushioning element to stand up for a long period is due to the strain of the motor in starting the car on the one hand, and the strain of the brake to stop the car on the other hand. To meet this the interior construction of the wheel has been so altered as to bring a larger volume of cushioning into position to resist both motor and brake strains.

The improved construction, as illustrated in the annexed drawings, wherein

Figure 1 is a face view of the outside of the wheel;

Fig. 2, a similar view, the wheel being seen from the inner side and the various parts of the cushion element shown in dotted lines;

Fig. 3, a vertical sectional view shown on the line 3—3 of Fig. 2;

Fig. 4, a face view with the inner face plate removed and parts broken away;

Fig. 5, a sectional perspective view showing in detail the construction of the tread or rim and its allied parts;

Fig. 6, a perspective view of one of the cushion elements;

Fig. 7, a detailed sectional perspective of the hub or the combined hub and inner wheel member;

Fig. 8, a detailed perspective view illustrating one of the cover plates and the closure washer or ring; and Fig. 9, a perspective view of one of the spacing sleeves.

For the purpose of description, the wheel may be said to comprise an outer wheel and combined inner wheel and hub with an interposed series of cushions. The outer wheel in the present case is composed of several members which are rigidly connected together and constitute in effect the rim section and the radially disposed abutments which cooperate in conjunction with the cushions with other abutments formed upon the inner wheel. The outer wheel section consists of a tire or tread member 1, shown in the instant case as flanged to run upon a rail, said tire being provided on its inner face with an inwardly extending flange or rib 2 located adjacent one edge, thus producing a relatively wide seat for the reception of a ring-shaped element 3. Said element 3 is of a width slightly narrower than the seat and is of a depth equal to that of the depth of rib 2. The ring and the rib are provided with alined openings through which bolts or rivets are passed as will later be set forth. Said ring is provided with a plurality of inwardly extending abutments designated generally by 4. Said abutments are formed integral with the member 3 and extend inwardly in a radial direction, being enlarged at their inner ends forming sector-shaped ends 5. About midway of its length each abutment is slightly enlarged upon its sides in order to afford sufficient strength of metal about an opening 6 which extends laterally through the abutment member. A similar opening 7 is formed in the abutment, or more specifically in the sector-shaped end or member 5.

The inner wheel may be said to comprise a hub 8 having formed integrally therewith an outwardly extending body section noted generally by 9. Said body section 9 is divided into a series of sections by radially disposed openings or U-shaped channels 10, four in number, and equal distantly spaced so as to receive the abutment members 4 when the inner wheel member is in place. The depth of the channels is such that the curved bottoms 11 thereof are out of contact with the curved face of the adjacent member 5 when the parts are in their normal position so that the inner wheel may move radially with reference to the outer wheel to an extent equal to the clearance between the bottom 11 of the channel 10 and the curved face of the abutment 4; thus while the members are free to move in relative radial directions, the abutment 4 forms a stop which prevents excessive movement or too great a compression of the cushioning elements hereinafter referred to interposed between the outer and the inner wheel members. The side walls 12 and 13 of the channels 10 stand in substantial parallelism and the periphery of the various elements between the channels 10 is depressed and denoted by 14. There is thus produced what may be termed fingers 15 adjacent each of the side walls 12 and 13, the function of which will presently appear.

The body of the web or outwardly extending portion 9 is provided with a series of relatively large openings 16. The various cushioning elements are alike in form, one of them being shown in perspective in Fig. 6. They may be said to comprise an arcuate-shaped body member 17 at each end of which there is provided an inwardly extending arm or element denoted respectively by 18 and 19. The inner face of the body is curved and the thickness of the body is such as to fill the space between the face 14 of the body 9 and the bearing face formed by the inner face of the ring 3 and the flange 2. Recesses 20 are provided and into which the fingers or projections 15 extend. The inwardly projecting members 18 and 19 are likewise given such shape as to fit around the enlargement upon the abutment members 4 and likewise to take a fair bearing against the inclined sides of the sector-shaped element 5 of the abutment. When the cushions are positioned between the inner and outer wheel elements, it will be seen that they completely fill the space between the inner and outer wheel members and the abutments 4, except for the space left between the curved face of the element 5 of the abutment 4 and the curved bottom 11 of the grooves or channels 10. To properly secure the parts against lateral displacement, or in other words, to lock the inner and outer wheel elements together, I provide cover-plates 21 and 22. Said plates are secured to the flange 2 and ring 3 by a series of rivets 23 and to the abutments 4 by rivets 24 and 25 which pass respectively through the openings 6 and 7. Another series of rivets as 26 pass through spacing sleeves 27 which latter are positioned in the openings 16, see Fig. 3, the sleeves being of a diameter less than the diameter of the openings so that they may move with the plates as the inner and outer elements partake of relative movement without the sleeves coming in contact with the walls of the openings 16. The plates thus hold the inner and outer wheel members against lateral displacement, while permitting an angular movement of these parts with relation to each other.

The hub section of the wheel upon each side is provided with annular grooves denoted respectively as 28 and 29, and ring-shaped elements formed of rubber or like material enter said grooves. Said ring-shaped members are denoted by 30 and 31, and are held in place by metallic rings 32 and riveted or otherwise secured to the face or side plates 21 and 22, see Fig. 8.

In use, and assuming that the wheels are, of course, mounted upon the axles of the vehicle, the weight of the vehicle will compress those cushion elements which at that time are at the lowermost portion of the wheel. Upon rotative movement being applied to the axles and consequently to the hub or the inner wheel element which is secured to the axle, such inner wheel element will tend to move and consequently place the fingers 18 or 19, depending upon which way the wheel is rotating, under compression, and the side walls 12, assuming that the wheel is rotating clockwise, will tend to force the inwardly projecting cushion members 18 against the fixed abutment members 4 of the outer wheel element. The compression exerted is in substantially a straight line between the faces 12 and the adjacent faces of the abutment, and consequently there is no tendency to unduly distort or push the cushion element forward into the space upon the opposite side of the abutment. In other words, there is no creepage of the cushion elements and no drawing action as where the cushion element is continuous as under the prior constructions. Even though the cushion elements be under compression, due to the driving power of the motor exerted through the axle, the wheel elements may still move in a radial direction to take up shock, owing to the passing of the wheel over rail joints or other obstructions, the degree of such radial movement being limited, however, by the fact that the abutments will gently bottom in case the shock is such as to cause an abnormal movement. During this relative radial movement of the inner and outer wheels, the cushion element, or more specifically, the body 17 thereof, will be placed under a state of compression between the face 14 and the inner face of the outer wall member formed by the ring-shaped element 3 and the flange 2.

The same action as above specified takes place upon the application of the brake to the wheel, the members 18 or 19, as the case may be, being placed under facewise compression between the inwardly extending outer wheel abutment members 4 and the wall of the U-shaped channel 10, it being understood, of course, that this compression takes place in connection with each outer wheel abutment and the opposite face or wall 12 or 13 which in effect are abutment members carried by the inner wheel member.

Having thus described my invention, what I claim is:

1. In a wheel in which transmission of vibrations is prevented and the tread of the wheel is cushioned, the combination of an inner wheel member provided with a series of radially disposed U-shaped channels; an outer wheel member provided with a series of inwardly extending radial abutments, said latter members passing into the U-shaped members aforesaid and being free of contact with the walls thereof; and a plurality of cushioning elements positioned between the inner and outer elements, each of said elements comprising an arcuate section and inwardly extending elements which substantially fill the space between the side walls of the adjacent abutments while leaving a space between the inner end of the abutment and the bottom of the channel.

2. A wheel in which transmission of vibrations is prevented and the tread of the wheel is cushioned, comprising in combination an inner wheel member having a hub and an outwardly extending body section provided with a series of radially disposed channels formed in its periphery with the periphery depressed intermediate said channels; an outer wheel member provided with a series of inwardly extending radially disposed abutment members, said members having their side walls in spaced relation to the walls of the radial channels; and a series of cushioning elements interposed between the inner and outer wheel members, said cushioning elements comprising an arcuate-shaped member fitting between the depressed peripheral portion of the inner wheel member and the inner face of the outer wheel portion and having inwardly projecting members fitting between the walls of the radial channels and the adjacent wall of the abutment of the outer wheel member.

3. A wheel in which transmission of vibrations is prevented and the tread of the wheel is cushioned, comprising in combination an inner wheel member having a series of U-shaped radially disposed channels formed in its outer face; an outer wheel member having a series of inwardly extending fixed abutments, said abutments being radially disposed and adapted to pass freely into the U-shaped channels aforesaid, the length of said abutments being such that the inner ends thereof are normally out of contact with the bottom of the U-shaped channels; and cushioning elements interposed between the periphery of the inner wheel members, the inner face of the outer wheel member and the side walls of the abutments and U-shaped channels whereby upon excessive radial movement of said wheel members one or more of said abutments will abut against the bottom of the U-shaped channels and thus relieve the cushioning elements from undue compression.

4. A wheel in which transmission of vibrations is prevented and the tread of the wheel is cushioned, comprising an inner wheel member; an outer wheel member, said members being free to move radially with reference to each other and likewise angularly with reference to each other; cushioning elements interposed between said wheel members, said cushioning elements presenting portions which are placed under direct compression upon radial movement of the parts and other portions which are placed under direct compression upon angular movement of the wheel members with relation to each other and means acting to limit the degree of compression exerted upon such cushioning elements when the same are placed under radial compression.

5. A wheel in which transmission of vibrations is prevented and the tread of the wheel is cushioned, comprising an inner wheel member consisting of a hub and an outwardly extending body portion, said body portion being provided with a series of radially disposed U-shaped channels with the periphery of said body portion depressed between said channels whereby a finger is formed adjacent each side of each of said U-shaped channels; an outer wheel member comprising a tread portion; a ring-shaped member secured to the inner face thereof, said member having extending inwardly therefrom a series of radially disposed abutments, the inner ends thereof being rounded; a series of cushioning elements interposed between said inner and outer wheel members, each of said cushioning elements comprising an arcuate body portion provided at each end with an inwardly extending member, said arcuate portion fitting between the depressed peripheral portion of the inner wheel member and the inner face of the outer wheel member, and said inwardly extending portions of said cushioning member fitting between the adjacent side wall of the U-shaped channels and the adjacent face of the inwardly extending abutment of the outer wheel member, each of said abutments being of such length as to be normally spaced away from the bottom of the U-shaped channel; and side plates secured to the outer wheel member and contacting with the side faces of the body of the inner wheel member.

6. A wheel in which transmission of vibrations is prevented and the tread of the wheel is cushioned, comprising an inner wheel member consisting of a hub and an outwardly extending body portion, said body portion being provided with a series of radially disposed U-shaped channels with the periphery of said body portion depressed between said channels whereby a finger is formed adjacent each side of each of said U-shaped channels; an outer wheel member comprising a tread portion; a ring-shaped member secured to the inner face thereof, said member having extending inwardly therefrom a series of radially disposed abutments, the inner ends thereof being rounded; a series of cushioning elements interposed between said inner and outer wheel members, each of said cushioning elements comprising an arcuate body portion provided at each end with an inwardly extending member, said arcuate portion fitting between the depressed peripheral portion of the inner wheel member and the inner face of the outer wheel member, and said inwardly extending portions of said cushioning member fitting between the adjacent side wall of the U-shaped channels and the adjacent face of the inwardly extending abutment of the outer wheel member, each of said abutments being of such length as to be normally spaced away from the bottom of the U-shaped channel; side plates secured to the outer wheel member and contacting with the side faces of the body of the inner wheel member; and flexible ring-shaped elements secured to said plates at the inner portions thereof, said ring-shaped members extending into grooves formed around the hub.

In testimony whereof I have signed my name to this specification.

EDWIN C. MADDEN.